(12) United States Patent  
Okada et al.

(10) Patent No.: US 9,390,336 B2  
(45) Date of Patent: Jul. 12, 2016

(54) IMAGE PROCESSING DEVICE, IMAGE PROCESSING METHOD

(71) Applicant: FUJITSU LIMITED, Kawasaki-shi, Kanagawa (JP)

(72) Inventors: Yasutaka Okada, Kawasaki (JP); Masami Mizutani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 773 days.

(21) Appl. No.: 13/668,778

(22) Filed: Nov. 5, 2012

(65) Prior Publication Data

US 2013/0250107 A1 Sep. 26, 2013

(30) Foreign Application Priority Data

Mar. 26, 2012 (JP) ................. 2012-069558

(51) Int. Cl.
*H04N 7/18* (2006.01)
*G06K 9/00* (2006.01)
*G06K 9/32* (2006.01)

(52) U.S. Cl.
CPC .......... *G06K 9/00805* (2013.01); *G06K 9/3241* (2013.01); *G06K 2209/23* (2013.01)

(58) Field of Classification Search
CPC ............ G06K 9/3241; G06K 9/00805; G06K 2209/23; H04N 7/18
See application file for complete search history.

(56) References Cited

U.S. PATENT DOCUMENTS

| | | | | |
|---|---|---|---|---|
| 5,638,116 A * | 6/1997 | Shimoura | ............ | G05D 1/0246 348/118 |
| 7,675,655 B2 * | 3/2010 | Marshall | ............... | G06T 3/4038 340/435 |
| 2005/0225636 A1 * | 10/2005 | Maemura | .................. | B60R 1/00 348/148 |
| 2008/0319640 A1 * | 12/2008 | Fujita | ................. | G01C 21/3476 701/439 |
| 2009/0021581 A1 * | 1/2009 | Sun | ..................... | G06K 9/00825 348/148 |
| 2009/0174773 A1 * | 7/2009 | Gowdy | ..................... | B60R 1/00 348/148 |
| 2010/0080419 A1 * | 4/2010 | Okugi | ................ | G06K 9/00791 382/104 |
| 2011/0187935 A1 * | 8/2011 | Omori | ...................... | H04N 5/21 348/625 |
| 2012/0127312 A1 * | 5/2012 | Nagamine | ................. | B60R 1/00 348/148 |

FOREIGN PATENT DOCUMENTS

JP      2005-276056     10/2005

* cited by examiner

*Primary Examiner* — Sath V Perungavoor
*Assistant Examiner* — Dakshesh Parikh
(74) *Attorney, Agent, or Firm* — Oblon, McClelland, Maier & Neustadt, L.L.P.

(57) ABSTRACT

An image processing device includes a processor; and a memory which stores a plurality of instructions that cause the processor to execute, capturing an image including vehicle side information, dividing the image into a plurality of areas, and defining a first divided area image including a center of a side end of the image and a second divided area image not including the center of the side end of the image; smoothing the first divided area image using a first filter, or smoothing the second divided area image using a second filter having a greater coefficient than that of the first filter; extracting a plurality of feature points from the first divided area image or the second divided area image; calculating an optical flow from the plurality of feature points of the first divided area image or the second divided area image.

19 Claims, 12 Drawing Sheets

FIG. 3
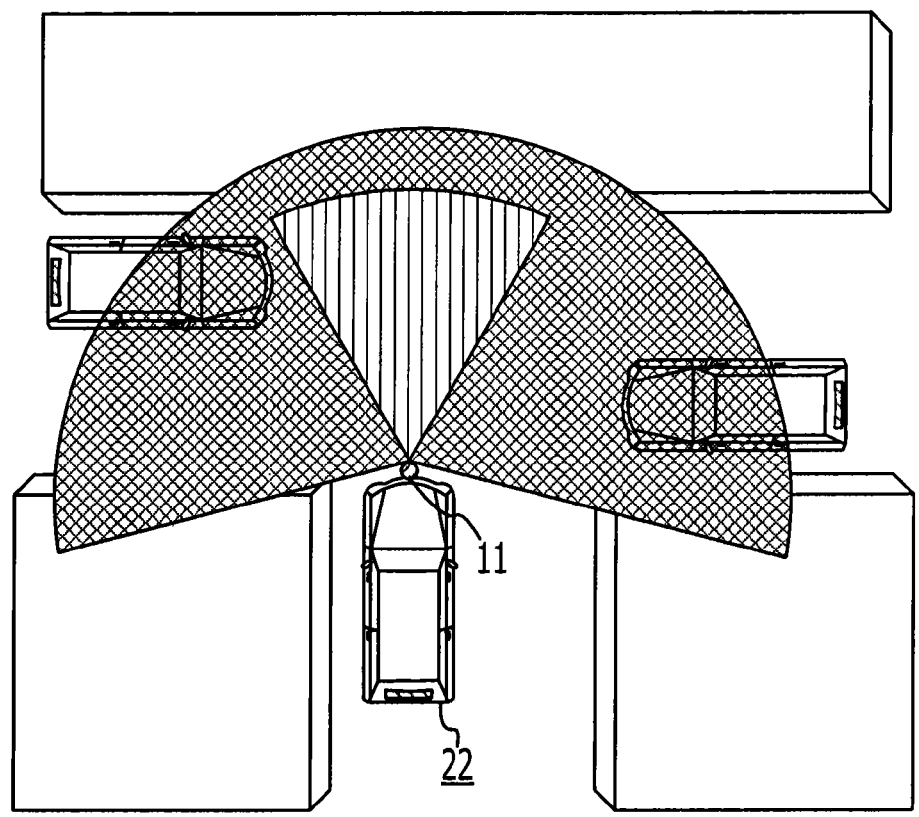
 FIELD-OF-VIEW RANGE OF DRIVER
 ANGLE-OF-VIEW RANGE OF IMAGING UNIT

FIG. 5A

| $\frac{1}{9}$ | $\frac{1}{9}$ | $\frac{1}{9}$ |
|---|---|---|
| $\frac{1}{9}$ | $\frac{1}{9}$ | $\frac{1}{9}$ |
| $\frac{1}{9}$ | $\frac{1}{9}$ | $\frac{1}{9}$ |

FIG. 5B

| $\frac{1}{25}$ | $\frac{1}{25}$ | $\frac{1}{25}$ | $\frac{1}{25}$ | $\frac{1}{25}$ |
|---|---|---|---|---|
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |

FIG. 7A

| TIME t | FEATURE POINT ID | COORDINATES (x, y) | LUMINANCE VALUE I | FILE NAME |
|---|---|---|---|---|
| 1.0 | 1 | $(x_1, y_1)$ | $I_1$ | Img.t1.0.id1 |
| 1.0 | 2 | $(x_2, y_2)$ | $I_2$ | Img.t1.0.id2 |
| 1.0 | 3 | $(x_3, y_3)$ | $I_3$ | Img.t1.0.id3 |
| ⋮ | ⋮ | ⋮ | ⋮ | ⋮ |

FIG. 7B

| TIME t | FEATURE POINT ID | COORDINATES (x, y) | LUMINANCE VALUE I | FILE NAME |
|---|---|---|---|---|
| 2.0 | 1 | $(x_1, y_1)$ | $I_1$ | Img.t2.0.id1 |
| 2.0 | 2 | $(x_2, y_2)$ | $I_2$ | Img.t2.0.id2 |
| 2.0 | 3 | $(x_3, y_3)$ | $I_3$ | Img.t2.0.id3 |
| ⋮ | ⋮ | ⋮ | ⋮ | ⋮ |

○ FEATURE POINTS
⊕ REFERENCE COORDINATES

| TIME t | FRAME ID | APPROACHING-OBJECT DETECTION AREA INFORMATION | FRAME ID CORRESPONDING TO TIME t - 1 |
|---|---|---|---|
| 1.0 | 1 | (x,y,w,h) | - |
| 1.0 | 2 | ⋮ | - |
| 1.0 | 3 | ⋮ | - |
| ⋮ | ⋮ | ⋮ | ⋮ |
| 2.0 | 1 | (x,y,w,h) | 1 |
| 2.0 | 2 | ⋮ | 2 |
| 2.0 | 3 | ⋮ | 3 |
| ⋮ | ⋮ | ⋮ | ⋮ |

IMAGE PROCESSING DEVICE, IMAGE PROCESSING METHOD

CROSS-REFERENCE TO RELATED APPLICATION(S)

This application is based upon and claims the benefit of priority of the prior Japanese Patent Application No. 2012-069558, filed on Mar. 26, 2012, the entire contents of which are incorporated herein by reference.

FIELD

The embodiments discussed herein are related to an image processing technique for supporting drive operation of a moving body by detecting an approaching object.

BACKGROUND

In recent years, various proposals have been made on techniques for presenting a driver with images in a range that is difficult to see from the driver or images in a range that becomes a dead spot as techniques for supporting safe driving of an automobile. In particular, on a road, such as a T-junction, etc., a field of view on the right and the left side of a vehicle is deteriorated significantly, and thus importance is attached on this scene among supporting techniques. As a supporting technique like this, a technique has been disclosed of the case where a plurality of cameras for capturing images of the right and left side of a vehicle is disposed at a front end of the vehicle, and the images taken by the plurality of cameras are displayed on a display unit of an in-vehicle monitor, etc. Also, proposals have been made on a detection technique of approaching objects for the purpose of detecting early approaching objects toward the own vehicle, such as the other vehicles and pedestrians, etc. For example, Japanese Laid-open Patent Publication No. 2005-276056 has disclosed a technique in which a plurality of images are captured time sequentially, feature points of the individual images are extracted, the feature points are compared among the individual images to be associated with feature points having a high correlation, and an optical flow is generated in order to detect an approaching object. In this regard, such an approaching object detection function is coupled with a general navigation function. Thereby, one display unit is capable of providing an approaching object detection function and a navigation function.

SUMMARY

In accordance with an aspect of the embodiments, an image processing device includes a processor; and a memory which stores a plurality of instructions that cause the processor to execute, capturing an image including vehicle side information, dividing the image into a plurality of areas, and defining a first divided area image including a center of a side end of the image and a second divided area image not including the center of the side end of the image; smoothing the first divided area image using a first filter, or smoothing the second divided area image using a second filter having a greater coefficient than that of the first filter; extracting a plurality of feature points from the first divided area image or the second divided area image; calculating an optical flow from the plurality of feature points of the first divided area image or the second divided area image having different acquisition time; and determining an approaching object approaching the vehicle on the basis of the optical flow.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 3 is a diagram illustrating an example of an imaging area by an imaging unit of the image processing device;

FIG. 5A illustrates an averaging filter having a size of 3×3 pixels, which is an example of a first filter;

FIG. 5B illustrates an averaging filter having a size of 5×5 pixels, which is an example of a second filter;

FIGS. 7A and 7B are examples of data structures of feature points extracted by an extraction unit, respectively;

DESCRIPTION OF EMBODIMENTS

In the following, descriptions will be given of an image processing device, an image processing method, and image processing computer program according to embodiments with reference to diagrams. In this regard, the embodiment will not limit the disclosed technique.

First Embodiment

Figure 1:
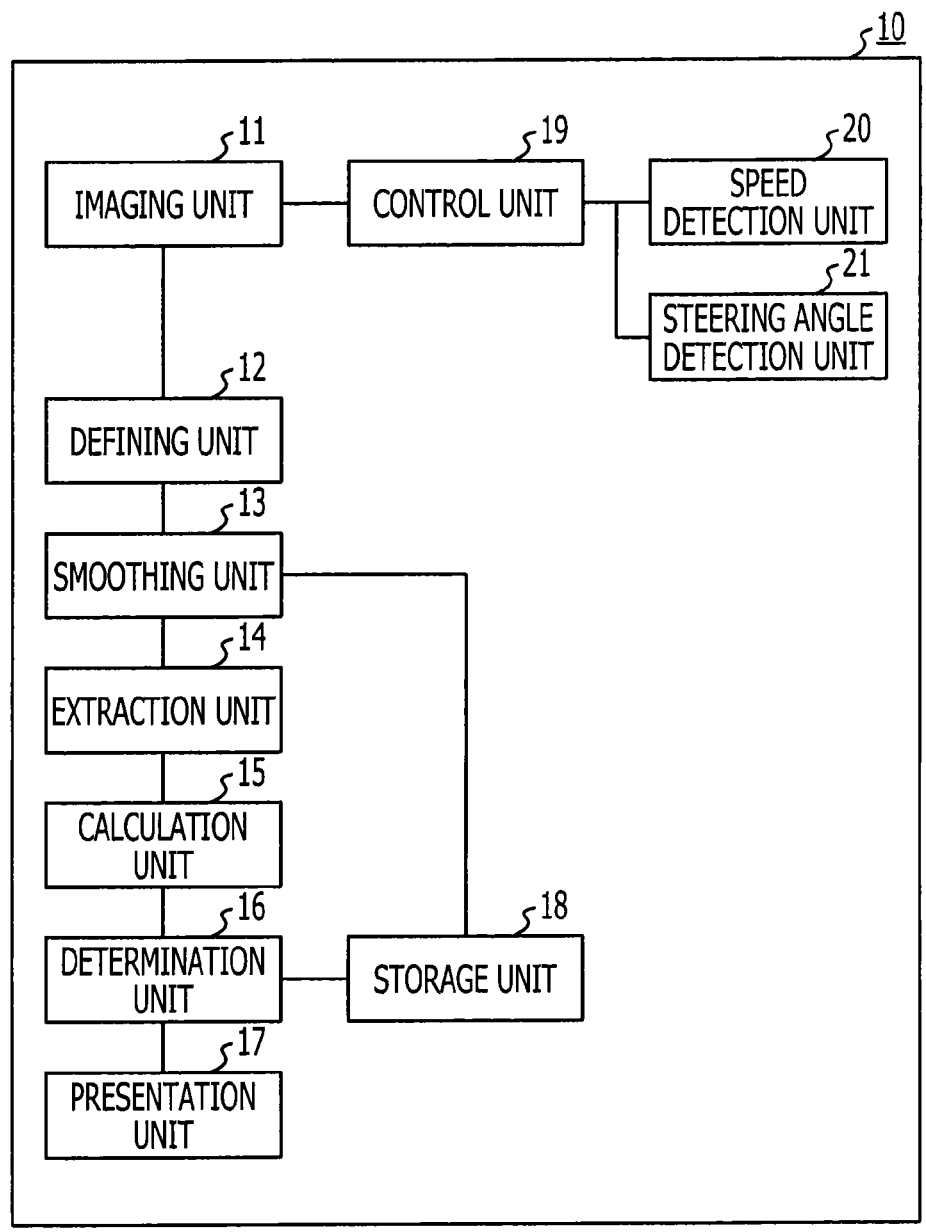
FIG. 1 is a diagram illustrating an example of an image processing device according to an embodiment.

FIG. 1 illustrates an example of a configuration of an image processing device according to an embodiment. An image processing device 10 includes an imaging unit 11, a defining unit 12, a smoothing unit 13, an extraction unit 14, a calculation unit 15, a determination unit 16, a presentation unit 17, a storage unit 18, a control unit 19, a speed detection unit 20, and a steering angle detection unit 21.

Each of the units of the image processing device 10 is formed, for example, as a corresponding hardware circuit by an individual hard-wired logic. Alternatively, each of the units of the image processing device 10 may be implemented on the image processing device 10 as one integrated circuit on which circuits corresponding to the individual units are integrated. Further, each of the units of the image processing device 10 may be a function module achieved by a computer program executed on a processor of the image processing device 10.

The imaging unit 11 is an imaging device, such as a charge coupled device (CCD) or complementary metal oxide semiconductor (CMOS) camera, etc., for example. By use of a fisheye lens, the imaging unit 11 becomes possible to capture an image including information on both sides of an own vehicle with a single eye. The imaging unit 11 is disposed, for example, at a center of a front end of the own vehicle. The image processing device 10 may include an acquisition unit, not illustrated in FIG. 1, for acquiring an image including the own vehicle-side information from the imaging unit 11.

The defining unit 12 receives an image captured by the imaging unit 11, and divides the image into a plurality of areas. Specifically, the defining unit 12 defines a first divided area image including a center of a side end of the image, and a second divided area image not including a center of a side end of the image. Further, the defining unit 12 defines the first divided area image so as to decrease a height of the first divided area from the side end of the image toward a center, and defines the second divided area image so as to increase a height of the second divided area from the side end of the image toward the center. A detailed description will be given of defining processing by the defining unit 12 into the first divided area image and the second divided area image.

The smoothing unit 13 performs smoothing on the first divided area image defined by the defining unit 12 using a first filter. The smoothing unit 13 performs smoothing on the second divided area image defined by the defining unit 12 using a second filter having a greater coefficient than that of the first filter. A detailed description will later be given of smoothing processing by the smoothing unit 13 using the first filter and the second filter.

The extraction unit 14 extracts feature points from the first divided area image or the second divided area image having been subjected to smoothing by the smoothing unit 13. The extraction unit 14 may extract feature points from the first divided area image before the second divided area image. A detailed description will later be given of extraction processing of feature points by the extraction unit 14.

The calculation unit 15 calculates an optical flow from the feature points of a plurality of the first divided area images or the second divided area images that have been acquired by the extraction unit 11 at different acquisition time. A detailed description will later be given of calculation processing of an optical flow by the calculation unit 15.

The determination unit 16 determines an approaching object, such as an other vehicle and a pedestrian, etc., that are approaching to an own vehicle on the basis of the optical flow calculated by the calculation unit 15. A detailed description will later be given of determination processing of an approaching object by the determination unit 16.

The presentation unit 17 is, for example, a display device, such as a display unit, etc., or a sound producing device, such as a speaker, etc. The presentation unit 17 presents presence or absence of an approaching object determined by the determination unit 16 to a driver (user).

The storage unit 18 is a storage device, such as a semiconductor memory element, for example, a flash memory, etc., or a hard disk, an optical disc, etc. The storage unit 13 is not limited to the above-described types of storage device, and may be a random access memory (RAM), or a read only memory (ROM). The storage unit 18 stores, for example, positional information on an approaching object determined by the determination unit 16.

The control unit 19 is connected to the imaging unit 11, the speed detection unit 20, and the steering angle detection unit 21. If a speed of an own vehicle detected by the speed detection unit 20 is a predetermined threshold value (for example, 10 Km/h) or more, the control unit 19 stops the imaging unit 11 from capturing images as occasion calls. If a steering angle of the own vehicle detected by the steering angle detection unit 21 is a predetermined threshold value (for example, 10 degrees) or more, the control unit 19 stops the imaging unit 11 from capturing images as occasion calls.

The speed detection unit 20 detects a speed of the own vehicle on the basis of the number of rotations of a wheel, etc., of the own vehicle. The speed information detected by the speed detection unit 20 is output to the control unit 19.

The steering angle detection unit 21 detects a steering angle of the own vehicle on the basis of a steering angle of a steering wheel of the own vehicle, etc. The steering angle information detected by the steering angle detection unit 21 is output to the control unit 19.

Figure 2A:
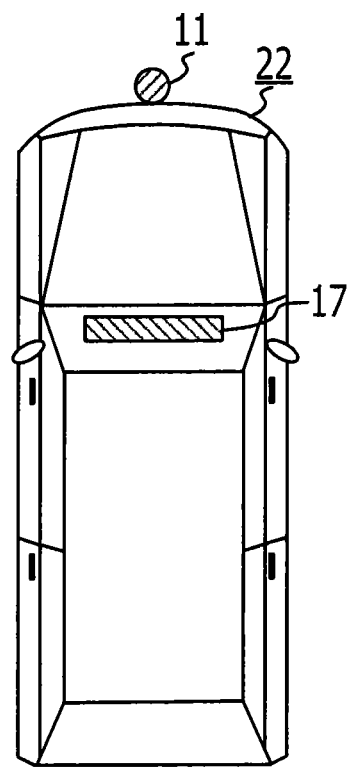
FIG. 2A is a top view of an own vehicle on which the image processing device is disposed.
Figure 2B:
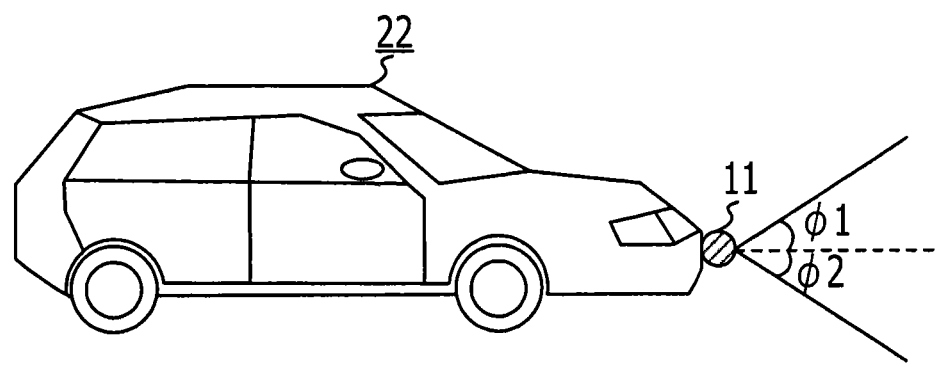
FIG. 2B is a side view of the own vehicle on which the image processing device is disposed.

FIG. 2A is a top view of the own vehicle on which the image processing device is disposed. FIG. 2B is a side view of the own vehicle on which the image processing device is disposed. As illustrated in FIGS. 2A and 2B, the imaging unit 11 is disposed, for example, at a center of a front end of an own vehicle 22. The presentation unit 17 is disposed, for example, inside the own vehicle 22. It is possible to dispose the other individual units of the image processing device 10 other than the imaging unit 11 and the presentation unit 17 in the vicinity of the imaging unit 11 or the presentation unit 17, or at any place. An elevation angle $\phi_1$ and a depression angle $\phi_2$ of the imaging unit 11 are defined as illustrated in FIG. 2B. The elevation angle $\phi_1$ and the depression angle $\phi_2$ ought to be suitably adjusted such that a front and sides of the own vehicle are suitably taken pictures of in accordance with a vehicle height of the own vehicle, etc.

FIG. 3 is a diagram illustrating an example of an imaging area by the imaging unit of the image processing device. As illustrated in FIG. 3, by use of a fisheye lens for the imaging unit 11, an angle of view extends as far as 180 to 190 degrees, which greatly exceeds a field-of-view range of a driver, so that it becomes possible to capture an image including side information of the own vehicle with a single eye. A T-junction is illustrated as an example in FIG. 3. However, it is possible to apply the image processing device 10 disclosed in this embodiment to the other shapes, such as a crossroads, etc.

(Defining Processing of First Divided Area Image and Second Divided Area Image by Defining Unit)

Figure 4:
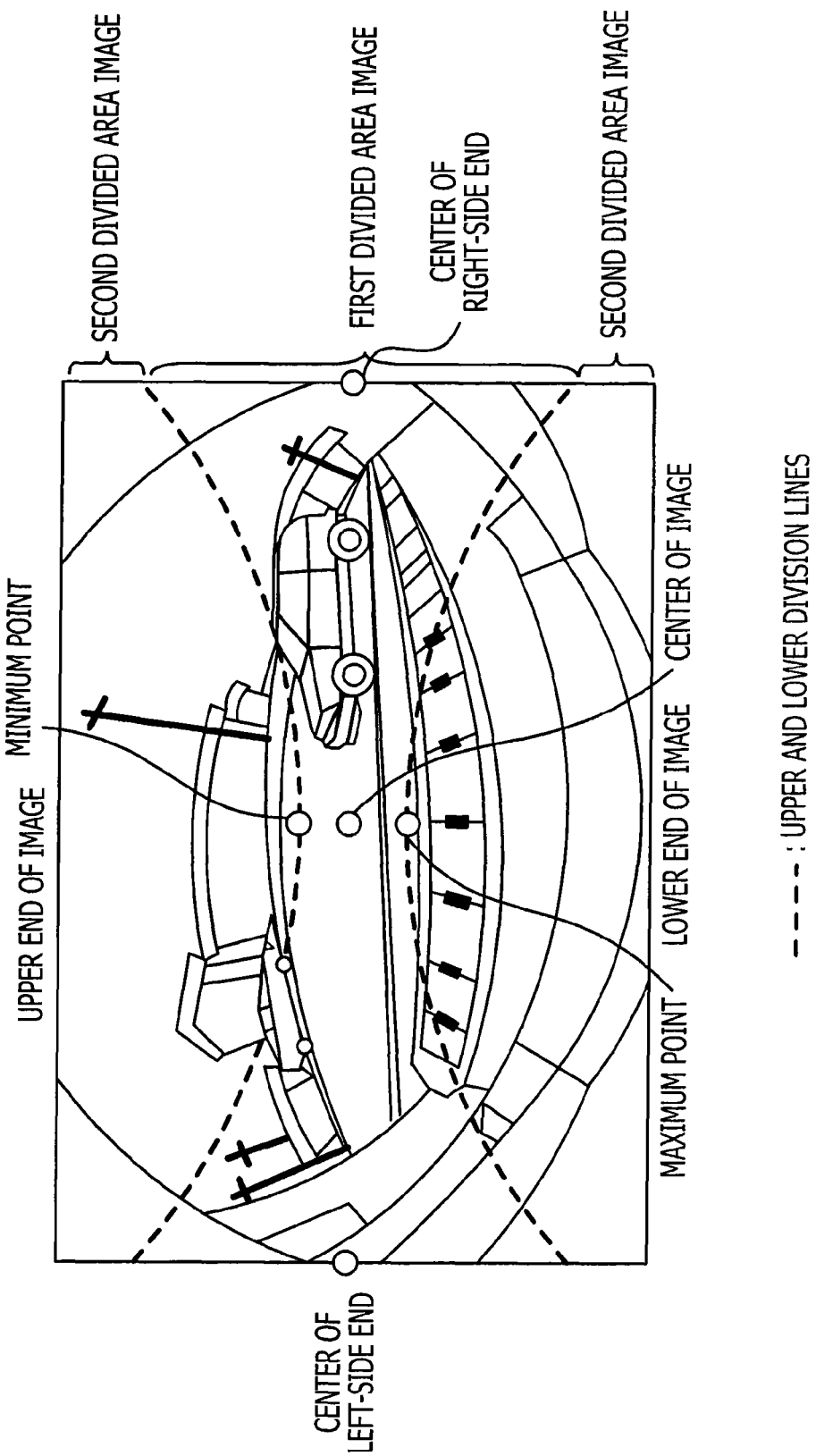
FIG. 4 is a diagram illustrating an example of a captured image by an imaging unit of an image processing device, a first divided image area, and a second divided image area.

FIG. 4 is a diagram illustrating an example of a captured image by the imaging unit of the image processing device, the first divided image area, and the second divided image area. When the defining unit 12 receives a captured image from the imaging unit 11, the defining unit 12 divides the image into a plurality of areas. Specifically, as illustrated in FIG. 4, the defining unit 12 defines the first divided area image including a center of a side end of the image, and the second divided area image not including the center of the side end of the image using an upper division line and a lower division line.

Further, the defining unit 12 defines the first divided area image such that the height of the first divided area decreases from the image side end toward a center of the image, and defines the second divided area image such that the height of the second divided area increases from the image side end toward a center of the image. In the example illustrated in FIG. 4, it is possible to define the upper division line and the lower division line by, for example, an any curve of the second order having an origin as an image center. Although a detailed description will be given later, a larger number of feature points are extracted from the first divided area image than the second divided area image, and thus a minimum point and a curvature of a quadratic curve of the upper division line ought to be defined on the basis of an amount of calculation allowed by the image processing device 10. For the lower division line, it is possible to replace the minimum point by a maximum point, and thus a detailed description will be omitted.

In consideration that vicinity of the image center is a driver's field-of-view range, a minimum point of the upper division line or a maximum point of the lower division line is defined so as to come close to or contact the image center (origin) as much as possible, and thus a curvature is defined to have a large curvature. Accordingly, it becomes possible for the first divided area image to include a wider side area of the own vehicle that is used for early detection of an approaching object. The upper division line and the lower division line may be defined using a linear function passing through the image center (origin).

It is possible for the defining unit 12 to define the upper division line and the lower division line using lens distortion data in the imaging unit 11, which is not illustrated in FIG. 1. For example, a description will be given of a procedure (1) to (5) for a method of defining the upper division line.

(1) Define a light vector Vi indicating an upper division line by a polar coordinate representation.

$Vi=(\theta i, \phi_1, 1)$; (Note that $\theta$ is a direction, $\phi_1$ is an elevation angle, and 1 is a length), (Example: $\theta i=-90, -67.5, -45, -22.5, 0, 22.5, 45, 67.5, 90$ (deg) is divided into 9, and $\phi_1=5$ deg.)

(2) A 3D vector Vi in the polar coordinate representation may be uniquely converted into a Cartesian coordinate representation, and this is defined as Ui.

(3) When a posture of the imaging unit 11 with respect to the earth surface is $\lambda=(\alpha, \beta, \gamma)$, (Note assumption is given that $\alpha$ is a roll angle, $\beta$ is a pitch angle, and $\gamma$ is a yaw angle), an upper division line in an image captured by the imaging unit 11 is observed as U'i.

$U'i=R-1(\lambda)Ui$; (Note that $R(\lambda)$ is a rotation matrix)

(4) A 3D vector U' having any incident direction may be converted into two-dimensional coordinates p in the image in accordance with a lens distortion data of the imaging unit 11. Here, it is assumed that a point on the image which corresponds to U'i is pi.

(5) Points pi are connected in sequence by applying a linear generation algorithm or a spline generation algorithm so that a sequence of points constituting the upper division line may be obtained. In this regard, for the lower division line, it is possible to define the lower division line by replacing the elevation angle $\phi_1$ by the depression angle $\phi_2$, and thus a detailed description will be omitted.

(Smoothing Processing by Smoothing Unit)

FIG. 5A illustrates an averaging filter having a size of 3×3 pixels, which is an example of a first filter. FIG. 5B illustrates an averaging filter having a size of 5×5 pixels, which is an example of a second filter. As illustrated in FIGS. 5A and 5B, the sum of all the coefficients stored in each of the filters becomes 1. The second filter has a larger coefficient than that of the first filter, and thus smoothing effect becomes greater than that of the first filter. In this regard, it is possible to use a weighted averaging filter in which a heavier weight is added to a pixel as the pixel is nearer to an origin (center) of the filter, or a Gaussian filter for the first filter or the second filter in addition to an averaging filter.

The smoothing unit 13 performs smoothing on the first divided area image using the first filter. Also, the smoothing unit 13 performs smoothing on the second divided area image using the second filter having a greater coefficient than that of the first filter. In this regard, the smoothing unit 13 may perform smoothing on either the first divided area image or the second divided area image, or may perform smoothing on both the first divided area image and the second divided area image. Thereby, more feature points are included in the first divided area image including the side area of the own vehicle, which is used for early detection of an approaching object. It becomes possible to reduce feature points in the second divided area image other than that.

(Extraction Processing of Feature Points by Extraction Unit)

Figure 6:
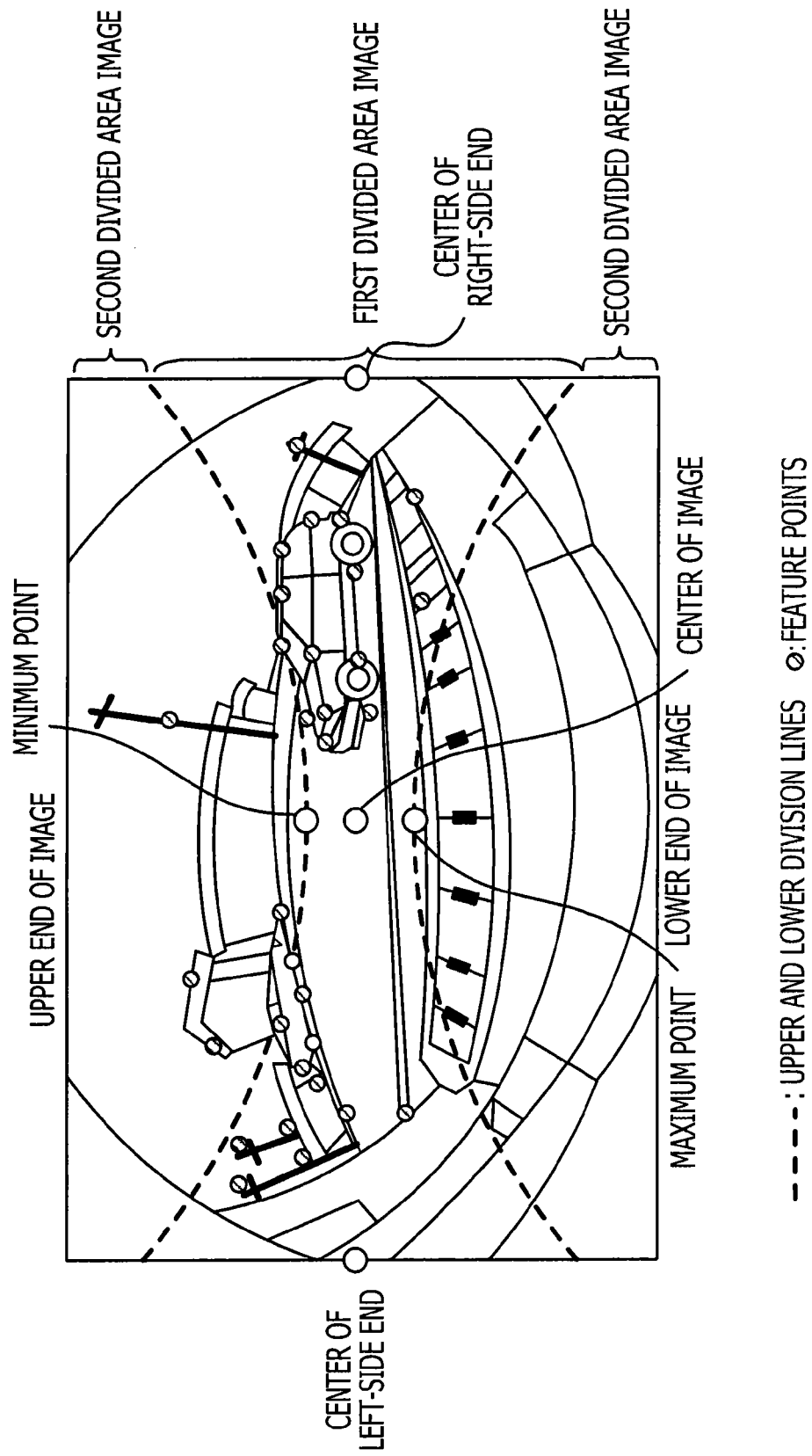
FIG. 6 is a diagram illustrating an example of feature points extracted from a first divided image area and a second divided image area of a captured image.

The extraction unit 14 extracts feature points from the image having been subjected to smoothing by the smoothing unit 13. In the extraction of feature points, it is possible to extract feature points using a publicly known mechanism, such as Harris operator, etc. In consideration of a memory capacity, the extraction unit 14 may extract feature points from the first divided area image before the second divided area image. FIG. 6 is a diagram illustrating an example of feature points extracted from a first divided image area and a second divided image area of a captured image. The smoothing unit 13 performs smoothing on the first divided area image using the first filter, and performs smoothing on the second divided area image using the second filter having a greater coefficient than that of the first filter. Thereby, as illustrated in FIG. 6, it becomes possible to detect a lot of feature points in the first divided area image including a side area of the own vehicle, which is used for early detection of an approaching object, and to reduce feature points in the second divided area image other than that. Thereby, it becomes possible to reduce amount of calculation.

In the case of using a fisheye lens in the imaging unit 11, because of an optical characteristic of a fisheye lens, resolution of a front part of the own vehicle, which becomes a field-of-view range of a driver, becomes high, and resolution of a side part of the own vehicle becomes low. This means that more feature points are extracted in the front part of the own vehicle, and the number of feature points extracted in a side part of the own vehicle, with which early detection of an approaching object is conducted, is reduced.

However, in this embodiment, the first divided area image is defined such that an area is reduced from a center of a side end of the image toward a center of the image, and the second divided area image is defined such that an area is enlarged from a center of a side end of the image toward a center of the image. Accordingly, the front part (a field-of-view range of the driver) of the own vehicle, which becomes high resolution, is subjected to smoothing using a second filter having a large filter coefficient, and thus it becomes possible to suppress extraction of feature points. To put it another way, in this embodiment, it is possible to cancel impacts of distribution of resolutions by use of a fisheye lens.

FIGS. 7A and 7B are examples of data structures of feature points extracted by the extraction unit, respectively. FIG. 7A is an example of a data structure of feature points extracted from an image at time t=1.0, when the imaging unit 11 has started capturing an image. The extraction unit 14 has a cache memory, etc., not illustrated in FIG. 1, and stores the feature point data there individually. The extraction unit 14 gives any ID and a file name to an extracted feature point, and stores coordinates (x, y) of a feature point on the image and a luminance value I, which is an example of a feature quantity. In this regard, a unit of coordinates (x, y) in the image is, for example, a pixel, and an origin ought to be set, for example, at the upper left of the image. FIG. 7B is an example of a data structure of feature points extracted from an image at time t=2.0, when the imaging unit 11 has started capturing an image. The extraction unit 14 individually stores the feature point data into the cache memory, etc., not illustrated in FIG. 1, in the same manner as at time t=1.0.

Calculation Processing of Optical Flow by Calculation Unit

Figure 8A:
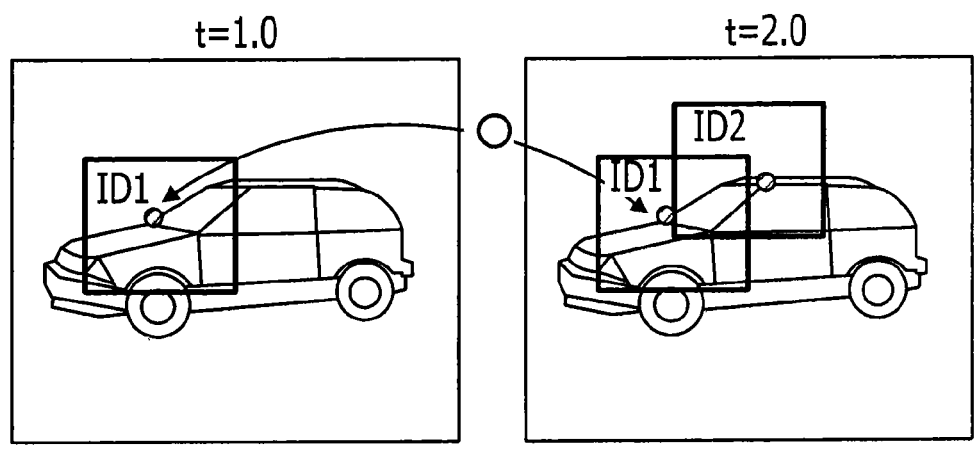
FIGS. 8A and 8B are examples of conceptual diagrams of calculation processing of an optical flow by a calculation unit.
Figure 8B:
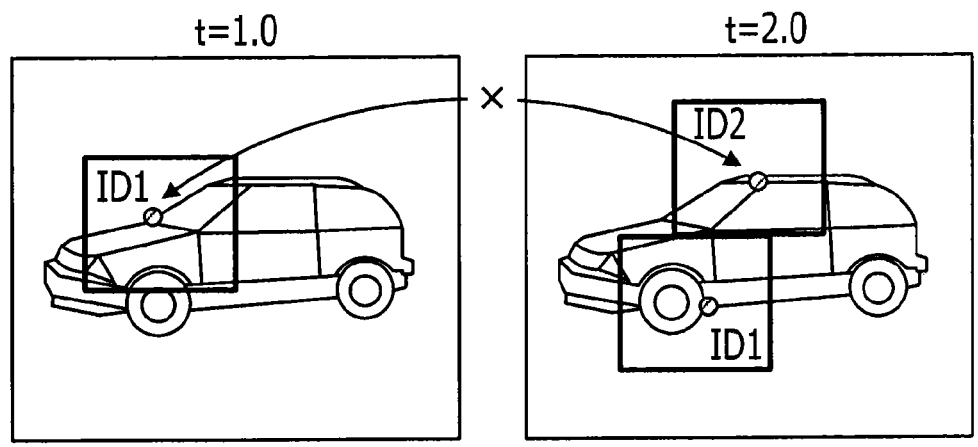

The calculation unit 15 calculates an optical flow from the feature point data extracted from the extraction unit 14. FIGS. 8A and 8B are examples of conceptual diagrams of calculation processing of optical flows by the calculation unit. It is possible to calculate an optical flow using, for example, a correlation calculation method of sum of absolute difference (SAD). Here, SAD is defined by the following expression.

$$SAD = \sum_{x,y} |I_1(x, y) - I_2(x, y)| \quad (1)$$

Note that (x, y) are coordinate values of feature points in the image, and $I_1$ and $I_2$ are luminance values at successive time.

In Expression 1 described above, a sum of absolute values of differences of luminance values of pixels at the same position is calculated. And it means that the smaller the sum value is, the higher the similarity is, and if completely matched, SAD has a value of 0. The calculation unit 15 associates a pair of feature points having a SAD value smaller than a threshold value t, and the SAD becomes minimum using a predetermined threshold value t as a reference for calculating an optical flow.

In the example in FIG. 8A, in association of pairs of a feature point at time t=1.0 and a feature point at time t=2.0, SAD values of both of $ID_1$ and $ID_2$ at time t=2.0 is less than a threshold value t. In this case, a pair of IDs having a minimum SAD are associated. In this example, $ID_1$ at time t=1.0 is paired with $ID_1$ at time t=2.0. It becomes possible for the calculation unit 15 to calculate a vector including a movement direction and a movement distance of the feature point, that is to say, an optical flow from the coordinate values of the paired feature points.

In the example in FIG. 8B, in association of pairs of a feature point at time t=1.0 and a feature point at time t=2.0, SAD values of both of $ID_1$ and $ID_2$ at time t=2.0 is greater than the threshold value t. In this case, a pair of feature points are not associated. Also, the calculation unit 15 does not have to calculate SAD values for all the feature points included in the image, and association processing of feature points ought to be performed in an area in the vicinity of the feature point coordinates (in an area of m×n (m and n are natural numbers) pixels).

It is possible to use a correlation calculation method, such as sum of squared intensity difference (SSD) and normalized cross correlation (NCC), etc., other than SAD. The calculation unit 15 may delete an optical flow less than the threshold value I as noise using a predetermined threshold value I. If there is a certain feature point at a same position for a predetermined threshold value z times or more, the calculation unit 15 may delete the feature point as a still object (background) at the time of calculating an optical flow. Further, if cases occur for predetermined threshold value times or more where a direction of a calculated optical flow differs from that of an optical flow at previous time, the calculation unit 15 may delete the feature point as noise.

(Determination Processing of Approaching Object by Determination Unit)

The determination unit 16 receives the optical flow from the calculation unit 15, and determines whether there is an approaching object or not. Here, the determination unit 16 may extract only an optical flow having a right-direction vector component in a left-side area from the image center in FIG. 6, and may extract only an optical flow having a left-direction vector component in a right-side area from the image center as occasion calls. The determination unit 16 groups a plurality of optical flows received from the calculation unit 15 by flows having individual positions in proximity and similarity in directions, and gives a frame ID. In this regard, the positional proximity and the directional similarity ought to be suitably set.

Figures 9A, 9B:
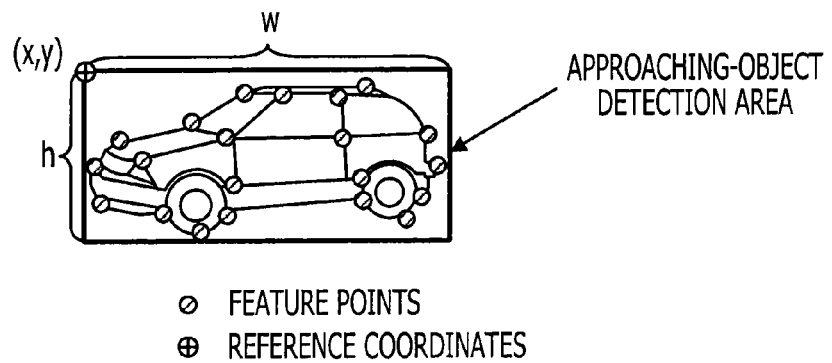
FIG. 9A is a conceptual diagram of grouping processing of an optical flow.
FIG. 9B is an example of a data structure of grouping processing of an optical flow generated by a determination unit.

FIG. 9A is a conceptual diagram of grouping processing of an optical flow. FIG. 9B is an example of a data structure of grouping processing of an optical flow generated by the determination unit. As illustrated in FIG. 9A, the determination unit 16 groups an optical flow using any positional proximity and directional similarity. The determination unit 16 approximates the grouped optical flow by a rectangle, for example, in order to generate a frame. And the determination unit 16 assumes that an upper left of the generated frame is a reference coordinates (x, y), and stores a frame length w, a height h, and further a frame ID corresponding to previous time t−1 into the cache memory, etc., not illustrated in FIG. 1, of the determination unit 16. The stored data comes to have data structure illustrated in FIG. 9B, for example. Also, the determination unit 16 may perform grouping on the basis of a frame aspect ratio (w/h) and a frame area (w×h) in consideration of aspect ratio and areas of the other vehicles and pedestrians.

If a frame is headed for a same direction over any time, or frames overlap each other for certain threshold-value times or more, the determination unit 16 determines the frame to be an approaching object. If the determination unit 16 has determined that there is an approaching object, the determination unit 16 outputs a determination result to the presentation unit 17. In this regard, the determination unit 16 may output area information of a frame that has been determined as an approaching object, specifically, the approaching object detection area information illustrated in FIG. 9B, etc., to the presentation unit 17 and the storage unit 18.

In order for the presentation unit 17 to inform the driver of presence of an approaching object promptly, the presentation unit 17 displays a position of an approaching object by a red frame, etc., on the basis of frame area information on the presentation unit 17. If the presentation unit 17 is provided with a general car navigation function, a position of an approaching object may be superimposed on map information. The presentation unit 17 may notify presence of an approaching object to a driver by sound.

By the image processing device disclosed in the first embodiment, it is made possible to capture images on the right and the left sides of an own vehicle with a single-eye camera, and it becomes possible to detect an approaching object with a small amount of calculation.

Second Embodiment

A front part of an approaching object, such as another vehicle, etc., which is approaching to the own vehicle, is taken a larger picture of as that object approaches to the own vehicle. This characteristic becomes more noticeable when a fisheye lens is used in the imaging unit 11. In general, a front part of a vehicle has a more complicated shape, such as a grille, etc., compared with the other parts of the vehicle, and thus a lot of feature points tend to be extracted. Accordingly, feature points are extracted excessively so that it might be assumed that it becomes difficult to sufficiently assign feature points to an approaching object, such as another vehicle, etc., that is approaching from a side of an image because of memory capacity restriction.

In consideration of this point, in addition to the processing in the first embodiment, the smoothing unit 13 of the image processing device 10 performs, using the second filter, smoothing on a part of the first divided area image that has been subjected to smoothing using the first filter. When the smoothing unit 13 performs smoothing processing, the smoothing unit 13 refers to the storage unit 18, and obtains approaching object detection area information of the frame determined to be an approaching object. The reference unit performs smoothing on an area in the vicinity of the approaching object using the second filter on the basis of the approaching object detection area information of the frame determined as an approaching object. In this regard, it is possible for the smoothing unit 13 to perform smoothing on a part of the first divided area image using a filter having any coefficient in addition to the second filter.

By the image processing device disclosed in the second embodiment, it becomes possible to detect an approaching object with a further smaller amount of calculation than that of the image processing device disclosed in the first embodiment.

Third Embodiment

In the above-described first embodiment or second embodiment, for example, if the first divided area image includes an object having a complicated texture, such as a group of buildings, etc., as a background, too many feature points are extracted from the object, and thus it might be assumed that it is difficult to sufficiently extract feature points of an approaching object having a high possibility of contacting the own vehicle.

In consideration of this point, in addition to processing in the first embodiment or the second embodiment, the extraction unit 14 of the image processing device 10 scans the first divided area image in an upward direction or in a downward direction starting from a center of a side end of the image in order to extract feature points. Also, the extraction unit 14 scans the second divided area image in an upward direction or in a downward direction so as to break away from the center of a side end of the image in order to extract feature points. Further, the extraction unit 14 defines an approaching direction in which an approaching object approaches to the vehicle on the basis of defined traveling direction of the own vehicle, and gives priority of scanning in the upward direction or the downward direction on the basis of the approaching direction.

To put it another way, the extraction unit 14 defines scanning order of the image, which becomes recording order of feature points on the basis of an existence probability of an approaching object. In order to define a recording direction of feature points and a scanning order, a travelling direction of a vehicle has to be determined. For example, vehicles run on a left lane in Japan, and thus the defined travelling direction is determined to be a left direction. In this case, an approaching direction in which an approaching object approaches to the own vehicle becomes a left direction in a lower end area than the center of side end of image. In an upper end area than the center of side end of image, an approaching direction in which an approaching object approaches to the own vehicle becomes the right direction.

Figure 10:
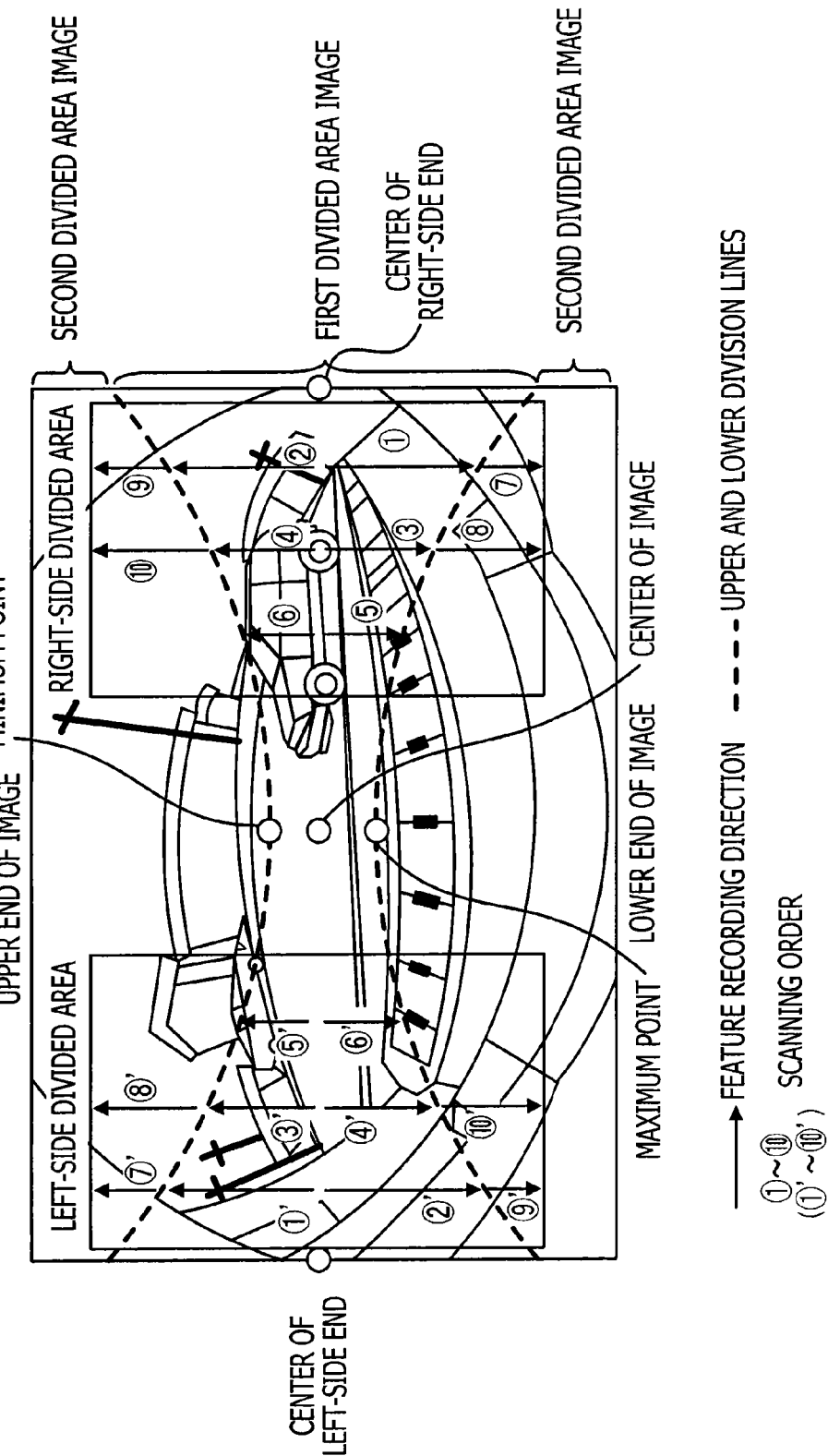
FIG. 10 is a conceptual diagram defining a scanning order of an image, which will be a recording order of feature points.

When an image is divided into right and left parts at center of the image, an existence probability individually differs in a lower end area than a center of a side end, and in an upper end area than the center of side end of image. FIG. 10 is a conceptual diagram defining a scanning order of an image, which will be a recording order of feature points. The extraction unit 14 divides the image into upper and lower parts at the side end center of the image, and further divides the image into right and left parts at the image center. The defining unit 12 may execute division of the image. A size of the division area ought to be suitably defined in accordance with the allowed amount of calculation. In FIG. 10, in the case where the defined travelling direction is a left direction, in the right side divided area, probability of detecting a left lane is high in a lower part than the image center, because the defined travelling direction is a left direction in Japan, the image is scanned in the downward direction of the image starting from the center of a side end of the image in order to extract feature points. In this regard, priorities of scanning order are given in the following order from (1) to (4).

(1) Right side divided area image>Left side divided area image
(2) First divided area image>Second divided area image
(3) Image side end>Image center
(4) Downward scanning>Upward scanning (in the case of right side divided area image), Upward scanning>Downward scanning (in the case of left side divided area image)

By the image processing device disclosed in the third embodiment, even in the case where the number of feature points is limited because of memory capacity restriction, it is possible to detect an approaching object early.

(Detection Processing of Approaching Object)

Figure 11:
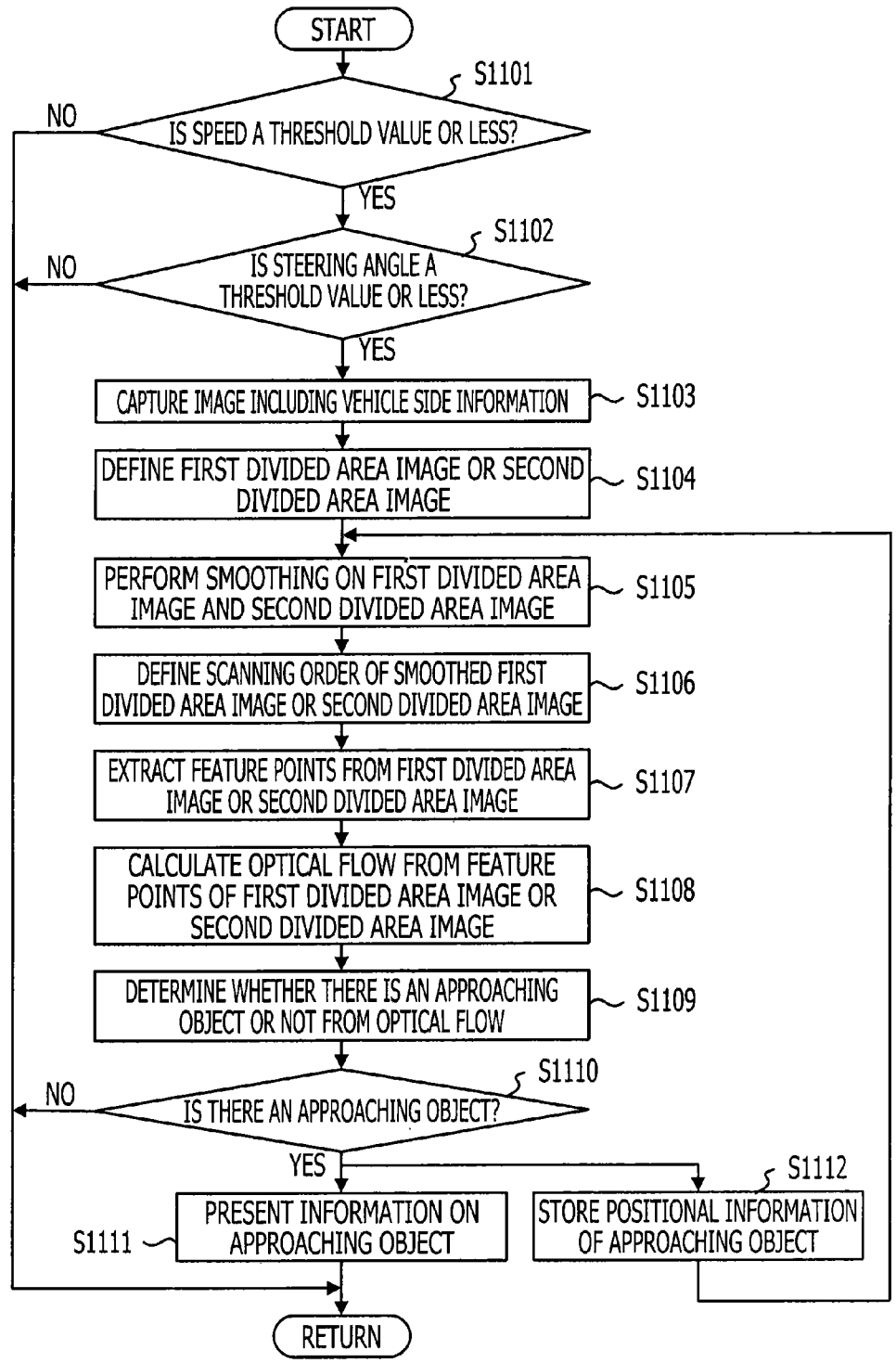
FIG. 11 is a flowchart illustrating an example of detection processing of an approaching object by an image processing device.

Next, a description will be given of operation of the image processing device 10. FIG. 11 is a flowchart illustrating detection processing of an approaching object by the image processing device.

In step S1101, the speed detection unit 20 detects a speed of the own vehicle by the number of rotations of a wheel, etc., of the own vehicle, and determines whether the speed of the own vehicle is a predetermined threshold value (for example, 10 Km/h) or less.

If the speed of the own vehicle is the predetermined threshold value (step S1101—Yes) or less, in step S1102, the steering angle detection unit 21 detects a steering angle of the own vehicle by a steering angle, etc., of the steering wheel of the own vehicle, and determines whether the steering angle of the own vehicle is a predetermined threshold value (for example, 10 degrees) or less.

If the steering angle of the own vehicle is a predetermined threshold value (step S1102—Yes) or less, in step S1103, the imaging unit 11 captures an image including information on the own vehicle sides. If a speed of the own vehicle and the steering angle is the predetermined threshold value (step S1101—No and step S1102—No) or more, a series of processing is repeated until the speed of the own vehicle and the steering angle becomes the predetermined threshold value or less.

In step S1104, the defining unit 12 defines the image received from the imaging unit 11 as a first divided area image including a center of a side end of the image and a second divided area image not including the center of a side end of the image using the upper division line and the lower division line. In step S1104, the defining unit 12 may define the first divided area image such that the area of the image is decreased from a side end of the image toward a center, and defines the second divided area image such that the area of the image is increased from the side end of the image toward the center.

In step S1105, the smoothing unit 13 performs smoothing on the first divided area image using the first filter. Also, the smoothing unit 13 performs smoothing on the second divided area image using the second filter having a greater coefficient than that of the first filter. Here, the smoothing unit 13 may refer to positional information (approaching object detection area information) of an approaching object stored in the storage unit 18 described below, and may further perform smoothing using the second filter on a part of the first divided area image having been subjected to smoothing using the first filter.

In step S1106, the extraction unit 14 defines scanning order of the image, which becomes recording order to feature points, on the basis of existence probability of an approaching object. Specifically, the extraction unit 14 scans the image in the upward direction or in the downward direction starting the center of a side end of the first divided area image in order to extract feature points. Also, the extraction unit 14 scans the second divided area image in the upward direction or in the downward direction second divided area image so as to break away the image from the center of a side end of the image in order to extract feature points. In this regard, step S1106 ought to be executed as occasion calls, and is not a mandatory step.

In step S1107, the extraction unit 14 extracts feature points from the image having been subjected to smoothing by the smoothing unit 13. The extraction unit 14 may extract feature points from the first divided area image before the second divided area image in consideration of a memory capacity.

In step S1108, the calculation unit 15 calculates an optical flow from the feature point data extracted by the extraction unit 14. In step S1108, the calculation unit 15 may delete an optical flow having a value not higher than a predetermined threshold value 1 as noise using the threshold value 1. Also, if there is a certain feature point at a same position for a predetermined threshold value z times or more, the calculation unit 15 may delete the feature point as a still object (background) at the time of calculating the optical flow. Further, if cases occur for predetermined threshold value times or more where a direction of a calculated optical flow differs from that of an optical flow at previous time, the calculation unit 15 may delete the feature point as noise.

In step S1109, the determination unit 16 receives an optical flow from the calculation unit 15, and determines whether there is an approaching object or not. In step S1109, the determination unit 16 groups an optical flow using any positional proximity and directional similarity. The determination unit 16 approximates the grouped optical flow by a rectangle, for example, to generate a frame. And the determination unit 16 assumes that an upper left of the generated frame is a reference coordinates (x, y), and stores a frame length w, a height h, and further a frame ID corresponding to previous time t−1 into the cache memory, etc., not illustrated in FIG. 1, of the determination unit 16.

In step S1109, the determination unit 16 may perform grouping on the basis of a frame aspect ratio (w/h) and a frame area (w×h) in consideration of aspect ratio and areas of the other vehicles and pedestrians. If a frame is headed for a same direction over any time, or frames overlap each other for certain threshold-value times or more, the determination unit 16 determines the frame to be an approaching object.

In step S1110, if the determination unit 16 has determined that there is an approaching object (step S1110—Yes), the determination unit 16 outputs a determination result to the presentation unit 17. In this regard, at this time, the determination unit 16 may output area information of a frame that has been determined as an approaching object, specifically, the approaching object detection area information to the presentation unit 17 and the storage unit 18. In this case, in step S1112, the approaching object detection area information is stored in the storage unit 18. The approaching object detection area information stored in the storage unit is referenced by the smoothing unit 13 in step S1105 as described above.

In step S1110, if the determination unit 16 determines that there is no approaching object (step S1110—No), the processing returns to S1101. At this time, various kinds of data, such as an optical flow, etc., which is stored in the cache memory of the determination unit 16, not illustrated in the figure, may be deleted.

In step S1111, in order for the presentation unit 17 to inform the driver of presence of an approaching object promptly, the presentation unit 17 displays a position of an approaching object by a red frame, etc., on the basis of frame area information on the presentation unit 17. If the presentation unit 17 is provided with a general car navigation function, a position of an approaching object may be superimposed on map information. The presentation unit 17 may notify presence of an approaching object to a driver by sound.

Figure 12:
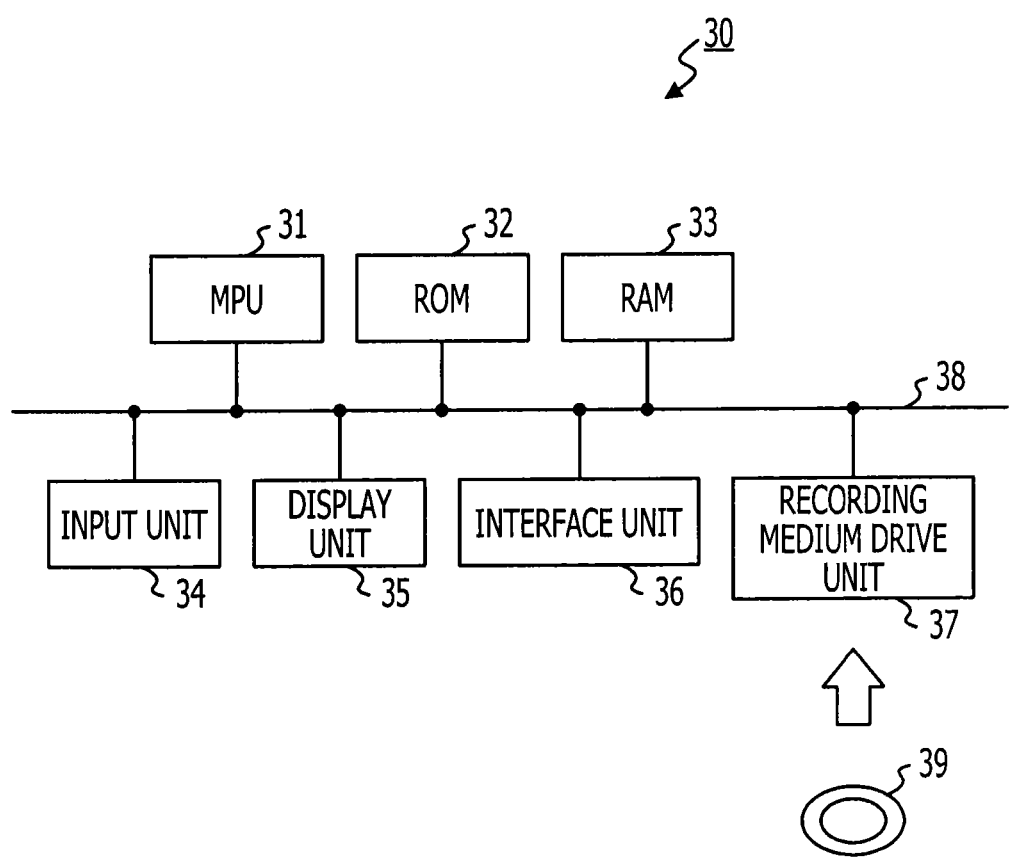
FIG. 12 is a diagram illustrating an example of a hardware configuration of a computer capable of being operated as individual functional blocks of the image processing device.

It is possible to configure the individual functional blocks of an image processing device according to each of the embodiments described above using a computer. FIG. 12 is a diagram illustrating an example of a hardware configuration of a computer capable of being operated as individual functional blocks of the image processing device. As illustrated in FIG. 12, a computer 30 includes an MPU 31, a ROM 32, a RAM 33, an input device 34, a display device 35, an interface unit 36, and a recording medium drive unit 37. These components are connected through a bus line 38, and are capable of mutually sending and receiving various kinds of data under the control of the MPU 31.

The micro processing unit (MPU) 31 is a processor for controlling operation of the entire computer 30. The read only memory (ROM) 32 is a read-only semiconductor memory in which a predetermined control program and various fixed numeric values are recorded. The MPU 31 reads and executes the control program at the time of starting the computer 30 so that it becomes possible to control operation of the individual components of the computer 30.

The random access memory (RAM) 33 is a semiconductor memory which may be used by the MPU 31 as a working storage area when various control programs are executed, and is capable of writing and reading at any time. In this regard, the RAM 33 functions as the storage unit 18 in FIG. 1.

The input device 34 is, for example, a keyboard device. When the input device 34 is operated by a user of the computer 30, the input device 34 obtains input of various kinds of information associated with the operation contents, and sends the obtained input information to the MPU 31.

The display device 35 is, for example, a liquid crystal display, and displays various texts and images in accordance with display data sent from the MPU 31. The interface unit 36 manages transferring various kinds of data with various devices connected to the computer 30. More specifically, the interface unit 36 performs analog/digital conversion on a captured image signal sent from the camera 11, and outputs a drive signal for driving the control unit 19, etc., for example.

It is possible to cause the computer 30 having such a configuration to function as the individual functional blocks of the image processing device according to each embodiment described above. For example, a control program is created for causing the MPU 31 to perform each of the processing procedure described with reference to FIG. 11. The created control program is stored in the ROM 32 in advance. A predetermined execution start instruction is given to the MPU 31 to read and execute the control program. In this manner, the MPU 31 functions as the imaging unit 11, the defining unit 12, the smoothing unit 13, the extraction unit 14, the calculation unit 15, the determination unit 16, the presentation unit 17, the storage unit 18, the control unit 19, the speed detection unit 20, and the steering angle detection unit 21 in FIG. 1. Accordingly, by connecting the imaging unit 11 to the interface unit 36 of the computer 30, it is possible to configure the image processing device in FIG. 1.

The recording medium drive unit 37 is a device that reads various control programs and data recorded on a portable recording medium 39. For example, the computer 30 may be configured such that a flash memory is used as the ROM 32, and the MPU 31 reads the above-described control program recorded on the portable recording medium 39 through the recording medium drive unit 38 to store the control program into the ROM 32. In this case, when the MPU 31 receives a predetermined execution start instruction, the MPU 31 reads and executes the control program stored in the ROM 32.

For the portable recording medium 39, it is possible to use a non-transitory recording medium, for example, a compact disc read only memory (CD-ROM), a digital versatile disc read only memory (DVD-ROM), etc. Also, for the portable recording medium 39, it is possible to use a semiconductor memory provided with a universal serial bus (USB) standard connector for example.

An image targeted for approaching object detection may be a moving image, the above-described processing may be performed for each frame, or the above-described processing may be performed at certain frame intervals.

In the above-described embodiments, each component of each device illustrated in the figure do not have to be physically configured as illustrated in the figures. That is to say, a specific form of distribution and integration of the individual devices is not limited to that illustrated in the figures, and it is possible to configure all of or a part of the devices in a functionally of physically distributed or integrated manner in any unit in accordance with various loads and use states, etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
a processor; and
a memory which stores a plurality of instructions that cause the processor to:
capture an image including vision information of a driver, wherein the image is captured by using a fisheye lens;
divide the image into a plurality of areas, and define a first divided area image including a center of a side end of the image having the vision information of the driver and a second divided area image not including the center of the side end of the image, wherein the defined first divided area image extends continuously from the side end of the image to another side end of the image, the another side end of the image being opposite to the side end;
smooth a pixel value of the first divided area image by using a first filter coefficient, and/or smooth a pixel value of the second divided area image by using a second filter coefficient having a greater coefficient than that of the first filter coefficient;
extract a plurality of feature points from the first divided area image or the second divided area image;
calculate an optical flow from the plurality of feature points of the first divided area image or the second divided area image having different acquisition time; and
determine an approaching object approaching a vehicle on a basis of the optical flow.

2. The image processing device according to claim 1, wherein the processor is further configured to define the first divided area image such that a height thereof decreases from the side end toward a center of the image, and define the second divided area image such that an area thereof increases from the side end toward the center of the image.

3. The image processing device according to claim 1, wherein the processor is further configured to extract feature points from the first divided area image before extracting feature points from the second divided area image.

4. The image processing device according to claim 1, further comprising:
a storage device configured to store positional information of the determined approaching object, wherein the processor is configured to:
smooth using the second filter coefficient on a part of the first divided area image having been subjected to the smoothing using the first filter coefficient on a basis of the positional information.

5. The image processing device according to claim 1, wherein the processor is further configured to extract the plurality of feature points by scanning the first divided area image in an upward direction or in a downward direction of the image starting from the center of the side end of the image.

6. The image processing device according to claim 1, wherein the processor is further configured to extract the plurality of feature points by scanning the second divided area image in an upward direction or in a downward direction of the image so as to break apart the image from the center of the side end of the image.

7. The image processing device according to claim 5, wherein the processor is further configured to define an approaching direction in which the approaching object approaches the vehicle on a basis of a defined travelling direction of the vehicle, and give priority of the scanning in the upward direction or in the downward direction on a basis of the approaching direction.

8. The image processing device according to claim 1, wherein the processor is further configured to:
detect a speed of the vehicle; and
stop the capturing of the image on a basis of the speed of the vehicle.

9. The device according to claim 1, wherein the processor is further configured to:
detect a steering angle of the vehicle; and
stop the capturing of the image on a basis of the steering angle.

10. An image processing method comprising:
- capturing an image including vision information of a driver, wherein the image is captured by using a fisheye lens;
- dividing the image into a plurality of areas, and defining a first divided area image including a center of a side end of the image having the vision information of the driver and a second divided area image not including the center of the side end of the image, wherein the defined first divided area image extends continuously from the side end of the image to another side end of the image, the another side end of the image being opposite to the side end;
- smoothing a pixel value of the first divided area image by using a first filter coefficient, and/or smoothing a pixel value of the second divided area image by using a second filter coefficient having a greater coefficient than that of the first filter coefficient;
- extracting a plurality of feature points from the first divided area image or the second divided area image;
- calculating, by a computer processor, an optical flow from the plurality of feature points of the first divided area image or the second divided area image having different acquisition time; and
- determining an approaching object approaching a vehicle on the basis of a optical flow.

11. The method according to claim 10, wherein the defining defines the first divided area image such that a height thereof decreases from the side end toward a center of the image, and defines the second divided area image such that an area thereof increases from the side end toward the center of the image.

12. The method according to claim 10, wherein the extracting extracts feature points from the first divided area image before extracting feature points from the second divided area image.

13. The method according to claim 10, further comprising:
- obtaining positional information from a storage device configured to store the positional information of the determined approaching object, wherein
- the smoothing performs smoothing using the second filter coefficient on a part of the first divided area image having been subjected to the smoothing using the first filter coefficient on a basis of the positional information.

14. The method according to claim 10, wherein the extracting extracts the plurality of feature points by scanning the first divided area image in an upward direction or in a downward direction of the image starting from the center of the side end of the image.

15. The method according to claim 10, wherein the extracting extracts the plurality of feature points by scanning the second divided area image in an upward direction or in a downward direction of the image so as to break apart the image from the center of the side end of the image.

16. The method according to claim 14, wherein the extracting defines an approaching direction in which the approaching object approaches the vehicle on a basis of a defined travelling direction of the vehicle, and gives priority of the scanning in the upward direction or in the downward direction on a basis of the approaching direction.

17. A non-transitory computer-readable storage medium storing an image processing program that causes a computer to execute a process comprising:
- capturing an image including vision information of a driver, wherein the image is captured by using a fisheye lens;
- dividing the image into a plurality of areas, and defining a first divided area image including a center of a side end of the image having the vision information of the driver and a second divided area image not including the center of the side end of the image, wherein the defined first divided area image extends continuously from the side end of the image to another side end of the image, the another side end of the image being opposite to the side end;
- smoothing a pixel value of the first divided area image by using a first filter coefficient, and/or smoothing a pixel value of the second divided area image by using a second filter coefficient having a greater coefficient than that of the first filter coefficient;
- extracting a plurality of feature points from the first divided area image or the second divided area image;
- calculating an optical flow from the plurality of feature points of the first divided area image or the second divided area image having different acquisition time; and
- determining an approaching object approaching a vehicle on a basis of the optical flow.

18. The image processing device according to claim 1, wherein the vision information includes an edge of a vision of the driver.

19. The image processing device according to claim 1, wherein the processor is further configured to smooth the pixel value of the first divided area by using a first planimetric area captured in a same time defined by the first filter coefficient.

* * * * *